US008769918B2

(12) United States Patent (10) Patent No.: US 8,769,918 B2
Williams (45) Date of Patent: Jul. 8, 2014

(54) MOWER DECK WITH CENTRALLY LOCATED CASTER WHEEL

(71) Applicant: Llewellyn E. Williams, Welch, MN (US)

(72) Inventor: Llewellyn E. Williams, Welch, MN (US)

(73) Assignee: Air Motion Systems, Inc., River Falls, WI (US)

( * ) Notice: Subject to any disclaimer, the term of this patent is extended or adjusted under 35 U.S.C. 154(b) by 0 days.

(21) Appl. No.: 13/621,873

(22) Filed: Sep. 18, 2012

(65) Prior Publication Data

US 2013/0086880 A1 Apr. 11, 2013

Related U.S. Application Data

(60) Provisional application No. 61/536,108, filed on Sep. 19, 2011.

(51) Int. Cl.
*A01D 34/00* (2006.01)

(52) U.S. Cl.
USPC .............................................. 56/17.5; 56/255

(58) Field of Classification Search
USPC ......... 56/17.5, 12.7, 16.7, 320.1, 255; 30/276
See application file for complete search history.

(56) References Cited

U.S. PATENT DOCUMENTS

| | | | |
|---|---|---|---|
| 210,794 A | 12/1878 | Lusher | |
| 1,788,391 A * | 1/1931 | Green | 16/44 |
| 2,287,128 A | 6/1942 | Packwood | |
| 2,522,112 A | 9/1950 | Gilmour | |
| 2,545,074 A | 3/1951 | Dielschneider | |
| 2,669,826 A * | 2/1954 | Watrous | 56/13.4 |
| 2,956,386 A | 10/1960 | Niemann | |
| 2,957,294 A * | 10/1960 | Hallenbeck | 56/15.4 |
| 3,112,594 A | 12/1963 | Hallenbeck | |
| 3,141,283 A * | 7/1964 | Swindler | 56/17.2 |
| 3,161,006 A * | 12/1964 | Willette et al. | 56/17.2 |
| 3,516,234 A * | 6/1970 | Brooksy | 56/16.9 |
| 3,526,083 A * | 9/1970 | Watson et al. | 56/10.7 |
| 3,548,571 A | 12/1970 | Snook | |
| 4,024,695 A | 5/1977 | Haseloff | |
| 4,077,191 A * | 3/1978 | Pittinger et al. | 56/12.7 |
| 4,084,395 A | 4/1978 | Nannen | |
| 4,679,383 A | 7/1987 | Quintel | |
| 4,704,848 A | 11/1987 | Nannen | |
| 4,845,929 A | 7/1989 | Kawasaki et al. | |
| 4,873,819 A * | 10/1989 | Shivers et al. | 56/17.5 |
| 5,163,273 A * | 11/1992 | Wojtkowski et al. | 56/11.9 |
| 5,507,137 A * | 4/1996 | Norris | 56/10.2 J |
| 6,971,223 B2 * | 12/2005 | Scott et al. | 56/12.7 |
| 7,059,106 B2 * | 6/2006 | Brandon | 56/12.7 |

* cited by examiner

*Primary Examiner* — Árpád Fábián-Kovács

(74) *Attorney, Agent, or Firm* — Wm., Larry Alexander, Attorney at Law, P.A.

(57) ABSTRACT

A rotary mower deck assembly has a caster assembly mounted within a spindle hub. The spindle hub is rotated within a hub, which is permanently and rigidly mounted to the mower deck. When rotated, the spindle hub rotates cutting blades mounted within the mower deck. The spindle hub is disposed within the spindle hub to bear the weight of the mower deck assembly.

12 Claims, 3 Drawing Sheets

MOWER DECK WITH CENTRALLY LOCATED CASTER WHEEL

CROSS-REFERENCES TO RELATED APPLICATIONS

This application claims priority under 35 U.S.C. §119(e) to, and hereby incorporates by reference, U.S. Provisional Application No. 61/536,108 filed 19 Sep. 2011.

BACKGROUND OF THE INVENTION

1. Field of the Invention

This invention relates to mowers and, in particular, this invention relates to self-propelled mowers having mower decks which mow vegetation adjacent to structures, such as fences, buildings and the like.

2. Background

An inherent design flaw in lawnmower decks is that the casters or supporting structures are outboard of the mower blades. This makes it impossible to trim closely with these interferences adjacent vertical features, such as fences, buildings and the like. Consequently, extensive trimming is necessary to achieve a neat, clipped appearance adjacent these vertical features.

SUMMARY OF THE INVENTION

This invention provides a mower which can mow significantly closer to these vertical features, thereby eliminating or greatly reducing the additional trimming necessary to achieve a neat and desirable appearance.

This machine may include a fixed hub mounted to a mowing deck. Within this hub are angular contact bearings in one embodiment.

In one embodiment within these bearings is a second hub, which rotates inside the fixed hub. This second hub is secured by sliding through the bearings from the bottom until a shoulder stops against the previously installed bearings; for example, one at the top and one at the bottom of the fixed hub.

The rotating hub may have external threads and a key slot to accept locking nuts, key, and pulley. If present, these are tightened to lock the rotating hub in place.

At the bottom of the rotating hub may be a T-shaped flange, which rotates inside a circular groove in the fixed hub to keep dirt out. The spindle portion of the rotating hub may have through holes to admit grease from outside to inside for lubrication. The flange depicted has holes machined in a circle for the purpose of mounting a disk-shaped device to which cutting blades are attached. The spindle portion of the hub may be bored through internally, and caged needle bearings may be press fit inside each end.

Inside the rotating hub is a stem and caster assembly in the embodiment shown. The stem is fit to rotate independent of the rotating hub within the caged needle bearings. At the top of the caster stem is a drilled and tapped bolt hole, which accepts a thrust bearing and shoulder bolt. The shoulder bolt and thrust bearing secure the caster assembly in position.

Above the caster is a beam mounted rigidly to the mower deck. This beam has a hole through which a height adjustment device rests on top of the thrust bearings on the casters. The deck is carried on the casters while allowing the cutting spindle to rotate independently. Cutting height is adjusted by moving the caster up or down vertically and locking it in place.

This machine can be mounted singularly or in multiple units synchronized with each other to obtain a wider cutting area.

Some nonlimiting features of this design include:
1) Ability to mow more closely with less need for trimming.
2) Lack of wheel marks in the grass because the blade passes behind the caster.
3) Lack of "scalping" caused by uneven mowing.
4) Easy mowing height adjustment.
5) Time and money savings.
6) Elimination of outboard obstructions, caster brackets, anti-scalp casters, etc.
7) Option for rigid mount or floating.
8) Adjustable rake angle.

Accordingly, a mower deck assembly is provided by this invention, the mower deck assembly having a deck, an exterior hub, a spindle hub, a plurality of first bearings, a pulley, a cutting blade assembly, a caster assembly, at least one second bearing, and a lubrication pathway. The exterior hub may be mounted to the deck such that the hub cannot move independently of the deck. The spindle hub may be rotatively disposable within the exterior hub. The plurality of first bearings may be disposed so as to allow rotation of the spindle hub independent of the exterior hub. The pulley may be rigidly attached to the spindle hub. The cutting blade assembly may be rotated by the spindle hub. The vertically adjustable caster assembly may be rotatively disposable within the spindle hub. The at least one second bearing may be disposable so as to allow the spindle hub to rotate independently of the caster assembly. The lubrication pathway may extend from an exterior surface of the exterior hub, through the spindle hub to the caster assembly.

Figure 1:
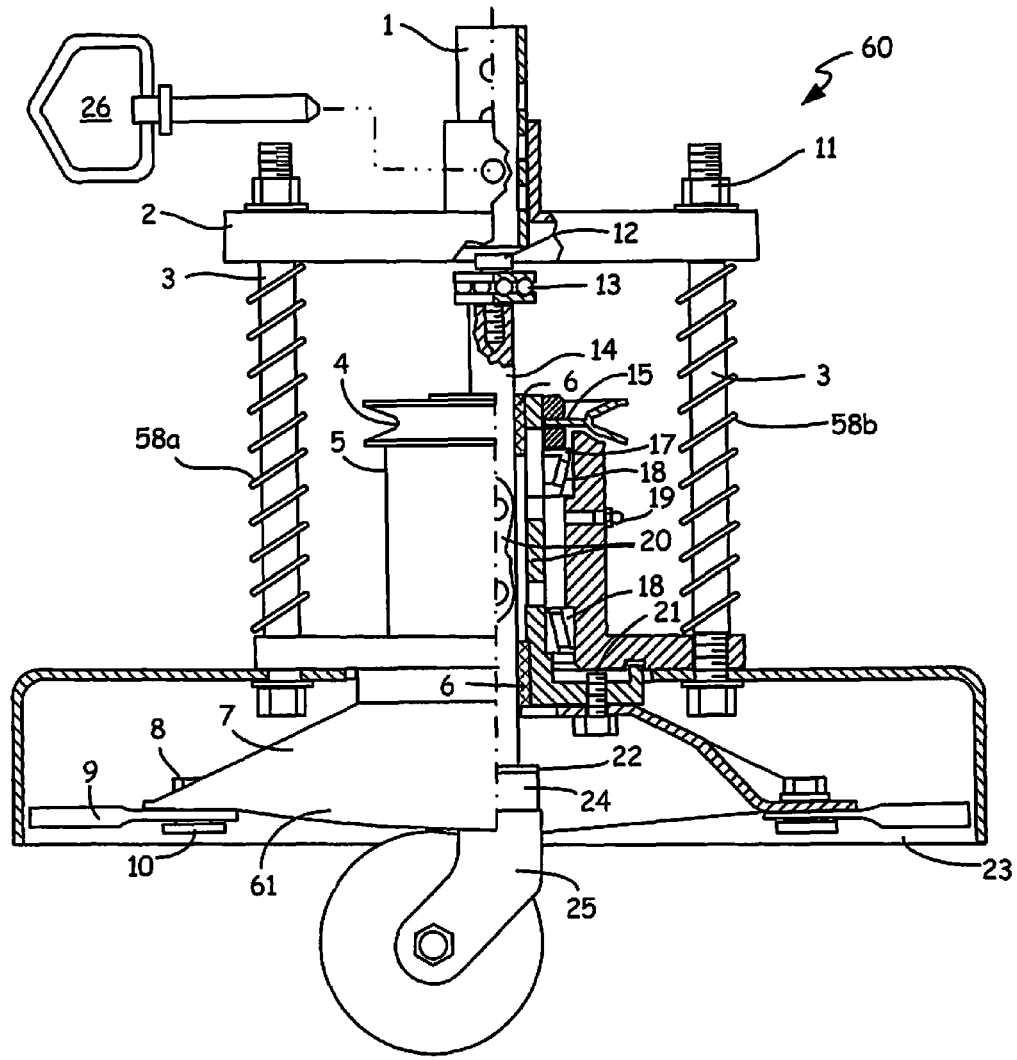
FIG. 1 is a partial sectional view of one embodiment of the mower deck of this invention.
Figure 2:
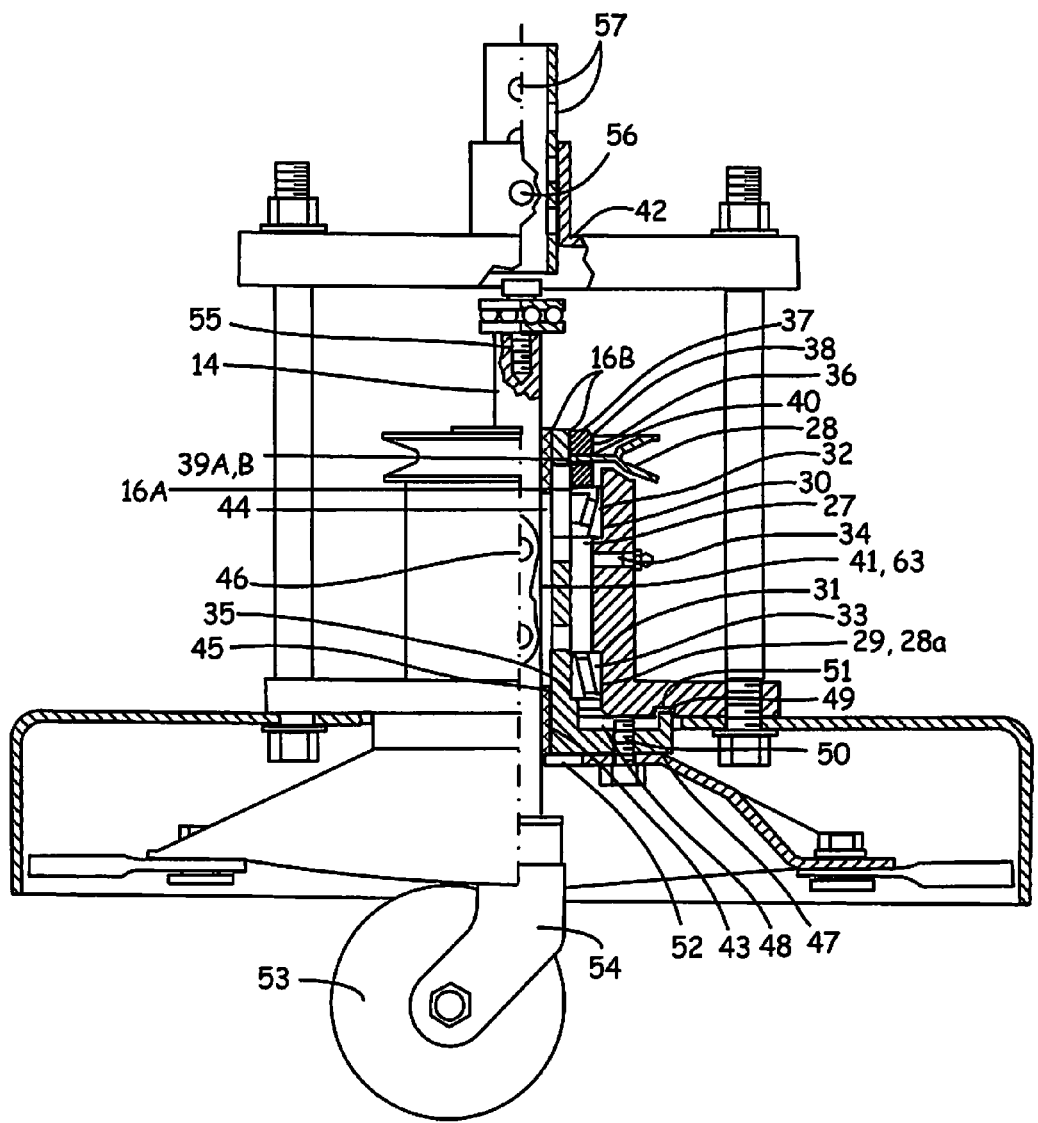
FIG. 2 is a partial sectional view of the mower deck of FIG. 1.
Figure 3:
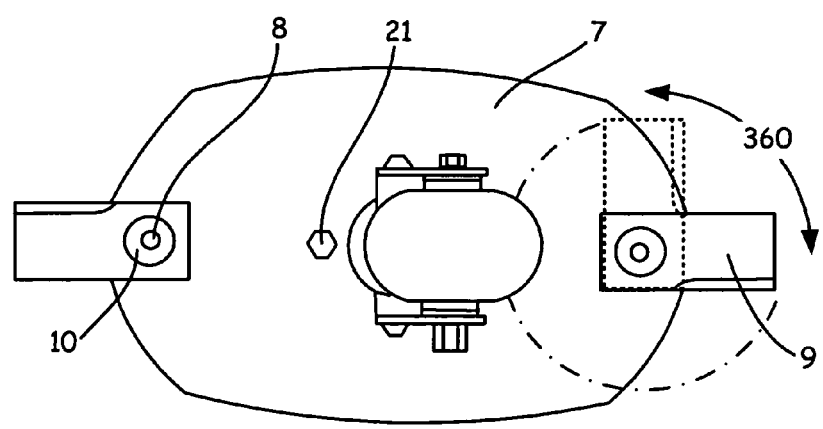
FIG. 3 is bottom view of one embodiment of the cutting blade assembly of this invention.

It is understood that the above-described figures are only illustrative of the present invention and are not contemplated to limit the scope thereof.

DETAILED DESCRIPTION

Unless otherwise defined, all technical terms used herein have the same meaning as commonly understood by one of ordinary skill in the art to which this invention belongs. Although methods and materials similar or equivalent to those described herein can be used to practice the invention, suitable methods and materials are described below. The materials, methods, and examples described and depicted are illustrative only and not intended to be limiting.

Any references to such relative terms as vertical or the like are intended for convenience of description and are not intended to limit the present invention or its components to any one positional or spatial orientation. Dimensions of the components in the attached figures may vary with a potential design and the intended use of an embodiment of the invention without departing from the scope of the invention.

Each of the additional features and methods disclosed herein may be utilized separately or in conjunction with other features and methods to provide improved devices of this invention and methods for making and using the same. Representative examples of the teachings of the present invention, which examples utilize many of these additional features and methods in conjunction, will now be described in detail with reference to the drawings. This detailed description is merely intended to teach a person of skill in the art further details for practicing preferred aspects of the present teachings and is not intended to limit the scope of the invention. Therefore, only combinations of features and methods disclosed in the following detailed description may not be necessary to practice the invention in the broadest sense, and are instead taught merely to particularly describe representative and preferred embodiments of the invention.

A person of ordinary skill in the art will readily appreciate that individual components shown on various embodiments of the present invention are interchangeable to some extent and may be added or interchanged on other embodiments without departing from the spirit and scope of this invention.

The foundation of one embodiment of the mower deck assembly 60 of this invention is an exterior hub 5 fixed permanently and rigidly to mower deck 23 top or bottom side such that the hub 5 cannot move or displace independently of the mower deck 23. Within this hub 5 is a bore 29 with two larger bores 28, 29a, one at each end, each creating a shoulder 30, 31. On these shoulders 30, 31 are pressed the outer races 32, 33 of angular contact bearings 18. On the outside of the fixed hub 5 is an externally mounted grease zerk 19 with passage 34 to the angular contact bearings 18 and caged needle bearings 6.

A hollow flanged spindle hub 20 is allowed to slide from the bottom through the two angular contact bearings 18. The flanged hub 20 has a shoulder 35, which rests against the bottom bearing 18. At the top of the flanged spindle hub 20 is a threaded section 36 with a key slot 37 running vertically to which is installed a large washer seal 17. On top of this washer seal 17 is a threaded nut 16a with a key slot 38, which is screwed down to make contact with the washer seal 17. The nut 16a is screwed down snugly but not so tight as to impede rotation of the spindle hub 20 within the fixed hub 5. On top of this nut 16a is a spider-like lock washer 15 with an internal tang 39a, which rests within the key slot 37 on the exterior of the spindle hub 20. A pulley 4 with a second spindle nut 16b is threaded on top of the lock washer 15. One of the external tangs 39b of the lock washer 15 is engaged into the receptacle slot 40 in the bottom nut 16a, fixing it securely to the rotating spindle hub 20, key slot 38 and receptacle slot 40 being identical. The top nut 16b is secured with the pulley 4 sandwiched between the lock washer 15 and itself, i.e., top nut 16b.

Within the spindle hub 20 is a bore 44 with two larger bores 42, 43, one at each end, each creating a shoulder 44, 45. On these shoulders 44, 45 are pressed caged needle bearings 6. The unthreaded portion of spindle hub 20 has through holes 46 to allow grease to migrate from the external fixed hub 5 through the flanged spindle hub 20 to caged needle bearings 6. The flange 47 itself is recessed on the inner side 48 with a raised section 49 about its circumference. On the face of the flange 47 are drilled and tapped bolt mounting holes 50 to which a cutting blade assembly 61 may be attached. In the embodiment shown, the cutting blade assembly has a disk-shaped device 7 with cutting blades 9, which are attached with disk mounting bolts 21.

The raised section of flange 49 mates with a circular groove 51 in the bottom of the fixed hub 5. These mating parts 5, 20 have clearance to allow the raised section of flange 49 to rotate within the groove 51 of the fixed hub 5 while acting as a dam to keep dirt and contaminants out.

The disk device 7 has two or more detachably mounted cutting blades 9, which in one embodiment may be turned over to expose a sharp edge on an opposite side or removed to sharpen or replace. The blades 9 are mounted on shouldered blade mounts 10, which allow the blades 9 to rotate freely about bolt mounting axis to avoid obstruction damage while the disk 7 is revolving, as opposed to a fixed blade. The disk 7 also has a large hole 52 in the center, through which the caster assembly 25 is installed and bolt mounting holes 50 to attach to the rotating hub flange 47.

The caster assembly 25 consists of a wheel 53 and caster 54 on one end and an internal threaded hole 55 on top of the hardened steel shaft 14, which acts as the inner race for the caged needle bearings 6. The caster assembly 25 is assembled through the disk 7, rotating flanged hub 20, both sets of caged needle bearings 6, and secured top-side with a shoulder bolt 12 and thrust bearing 13. The caster assembly 25, thrust bearing 13, and shoulder bolt 12 are free to slide axially, e.g., vertically, within caged needle bearings 6 to accommodate adjustment height of cutting blades 9 while allowing flanged hub blades 9 and disk 7 to revolve around caster assembly axis freely for cutting of vegetation. To the top of the mower deck 23 is mounted two posts 3 rising vertically and terminating at a hollow tube or beam 2 connecting the two posts 3 horizontally. The hollow tube 2 with a through hole 56 is mounted permanently to the beam 2 vertically above the center axis of the caster assembly 25. A hollow height adjusting tube 1 with offset through holes 57, 90 degrees apart, is allowed through the beam tube 2 to rest one end of top of thrust bearings 13. A pin 26 or equivalent connector, will slide through the beam tube hole 56 and aligned hole 57 in adjusting tube 1. Moving adjusting tube 1 up and down and rotating 90 degrees will give a series of height adjustments above the caster stem 14 to regulate various cut heights of rotating blades 9. A person of ordinary skill in the art will readily recognize other height-adjusting methods, e.g., threaded bolts and nuts or hydraulic rams, would be within the scope of this invention.

A compression spring 58a may be present about connecting posts 3 to allow horizontal beam 2 or a spring 58b above caster spindle thrust bearing 13 to vertically translate and maintain contact, or compensate for uneven surfaces being mowed.

Lubrication is obtained by an external-mounted grease zerk 19 on deck-mounted hub 5 in an entry to a lubrication pathway 63. The grease migrates in the lubrication pathway 63 through the passage to lubricate the two angular contact bearings 18, which allows the hollow flanged spindle hub 20 to rotate within the mounted hub 5. From there the grease moves through lubrication passage holes within the hollow flanged spindle hub 20 to the 2 caged needle bearings 6 mounted inside the flanged spindle hub 20. These bearings allow the flanged spindle hub 20 to spin around the caster stem 14 while allowing the caster stem 14 to rotate and slide up and down vertically for height adjustment.

This spindle assembly may be used singly, doubly, or three or more may be ganged up totally from underneath, without the need for external deck supports.

Because numerous modifications of this invention may be made without departing from the spirit thereof, the scope of the invention is not to be limited to the embodiments illustrated and described. Rather, the scope of the invention is to be determined by the appended claims and their equivalents.

What is claimed is:

1. A mower deck assembly, comprising:
a deck;
an exterior hub mounted to said deck such that said exterior hub cannot move independently of said deck;
a spindle hub rotatively disposable within said exterior hub;

a plurality of first bearings disposed so as to allow rotation of said spindle hub independent of said exterior hub;

a pulley rigidly attached to said spindle hub;

a cutting blade assembly rotated by said spindle hub;

a caster assembly rotatively disposable within said spindle hub, said caster assembly comprising means for vertical adjustment;

at least one second bearing disposable so as to allow said spindle hub to rotate independently of said caster assembly; and a lubrication pathway extending from an exterior surface of said exterior hub, through said spindle hub to said caster assembly.

2. The mower deck assembly of claim 1, further comprising means for vertically adjusting said cutting blade assembly.

3. The mower deck assembly of claim 2, wherein said vertically adjusting means includes a plurality of connecting posts attached to said deck;

a horizontal beam attached to said connecting posts;

a height adjuster rigidly attached to said caster assembly and vertically adjustable through said horizontal beam.

4. The mower deck assembly of claim 1, wherein said spindle hub defines a slot to positionally fix said spindle hub relative to said pulley.

5. The mower deck assembly of claim 1, wherein said at least one second bearing comprises a thrust bearing attached to said caster assembly.

6. The mower deck assembly of claim 5, wherein said thrust bearing is vertically and adjustably attached to said caster assembly.

7. The mower deck assembly of claim 1, further comprising a zerk threadably disposed in said exterior hub within said lubrication pathway.

8. The mower deck assembly of claim 1, wherein said first bearings include angular contact bearings.

9. The mower deck assembly of claim 1, wherein said spindle hub includes a flange.

10. The mower deck assembly of claim 9, wherein said cutting blade assembly attaches to said flange.

11. The mower deck assembly of claim 10, wherein said exterior hub defines a circular groove and wherein said flange defines a raised section rotating in said circular groove.

12. The mower deck assembly of claim 1, wherein said cutting blade assembly comprises a disk device and a plurality of cutting blades attached to said disk device.

* * * * *